United States Patent [19]
Ueda et al.

[11] Patent Number: 4,757,436
[45] Date of Patent: Jul. 12, 1988

[54] CURRENT-TYPE CONVERTER PROTECTING APPARATUS

[75] Inventors: Shigeta Ueda, Hitachi; Mitsuyuki Hombu, Katsuta; Takeki Ando, Ibaraki; Kazuhiko Sasaki, Katsuta; Kazuo Honda, Hitachiota; Hideaki Takahashi, Katsuta, all of Japan

[73] Assignee: Hitachi, Ltd., Tokyo, Japan

[21] Appl. No.: 9,478

[22] Filed: Feb. 2, 1987

[30] Foreign Application Priority Data

Feb. 3, 1986 [JP] Japan .................... 61-20161

[51] Int. Cl.⁴ ........................... H02H 7/125
[52] U.S. Cl. .................... 363/54; 363/129; 361/91; 361/100
[58] Field of Search .................. 363/52–54, 363/85, 87–88, 128, 129; 361/88, 90–91, 100

[56] References Cited

U.S. PATENT DOCUMENTS 3,622,862  11/1971  Boksjo ........................ 363/54
4,044,295   8/1977  Ferraiolo et al. ............. 363/54

FOREIGN PATENT DOCUMENTS 0070328  6/1977  Japan ......................... 363/54
0083268  7/1981  Japan ......................... 363/54

OTHER PUBLICATIONS

Yoshioka et al., "PWM GTO CONVERTER OF NEW COMMUTATION ENERGY SYSTEM", IEEE of Japan, Semiconductor Power Conversion Society, SPC-84-60.
Viriya et al., "NEW PWM-CONTROLLED GTO CONVERTER", IEEE Power Electronics Specialists Conference '85 Record, pp. 581–589.

Primary Examiner—Peter S. Wong
Attorney, Agent, or Firm—Antonelli, Terry & Wands

[57] ABSTRACT

In a current-type converter system in which a DC current is fed to a load through a pulsating current suppressing DC reactor from a current-type converter constituted by self-extinction elements connected in a bridge circuit, a converter protection apparatus is arranged such that when a fact that a terminal voltage of the DC reactor becomes an overvoltage is detected, the self-extinction elements are turned on so as to form a closed circuit including the DC reactor, the load, and the converter so that the overvoltage can be suppressed and continuous operation of the converter can be carried out.

10 Claims, 9 Drawing Sheets

CURRENT-TYPE CONVERTER PROTECTING APPARATUS

BACKGROUND OF THE INVENTION

The present invention relates to a current-type converter protecting apparatus and particularly to an apparatus suitable for protecting a current-type converter from occurrence of an overvoltage due to employment of self-extinction elements in the converter.

Generally, as a system for converting AC power into DC, there have been used voltage-type converters and current-type converters.

Recently, various trials have been carried out for improving a power factor or the like by using self-extinction elements in such converters. For example, a voltage-type converter employing self-extinction elements has been proposed in U.S. Pat. No. 4,361,866, etc.

On the other hand, various current-type converters employing self-extinction elements have been proposed. In such current-type converters, however, there is a problem that an overvoltage is caused when a current is cut off. Protection of a current-type converter from such an overvoltage is discussed in a paper by Yoshioka et al, "PWM GTO CONVERTER OF NEW COMMUTATION ENERGY SYSTEM" (The Institute of Electrical Engineers of Japan, Semiconductor Power Conversion Society, Material SPC-84-60). In this paper, insufficient consideration has been made into a point of how to protect main circuit elements of the current-type converter from an overvoltage caused across a DC reactor provided at the output side of the converter, when an erroneous turn-off pulse is mixed at any point in time into a gate signal due to noises or the like. This is because the protecting apparatus disclosed in the above paper is for overvoltage suppresion and energy feeding back in commutation of the main circuit current and it cannot cope with an overvoltage caused in any point in time, so that the period in which an overvoltage can be suppressed is limited to the time of commutation. Further, in the conventional converter protecting apparatus, there has been another problem that the arrangement of the protecting apparatus is complicated because a diode bridge, capacitors, self-extinction elements are used.

SUMMARY OF THE INVENTION

It is an object of the present invention is to provide an apparatus for protecting a current-type converter using self-extinction elements and being provided with a DC reactor connected thereto for suppressing pulsation in a DC output of the converter.

The converter protecting apparatus according to the present invention is featured in that an overvoltage due to the DC reactor is detected to thereby control the self-extinction elements constituting the current-type converter to form a closed circuit including the DC reactor to thereby suppress the overvoltage.

Furthermore, according to the present invention, protection is made in accordance with the characteristics of the self-extinction elements that are used, a countermeasure is provided for enabling the converter to be operated continuously after occurrence of an overvoltage, and so on.

These and other objects and features of the present invention will become more apparent from following description about preferred embodiments of the invention when read in conjuction with the accompanying drawings.

DESCRIPTION OF THE PREFERRED EMBODIMENTS

Figure 1:
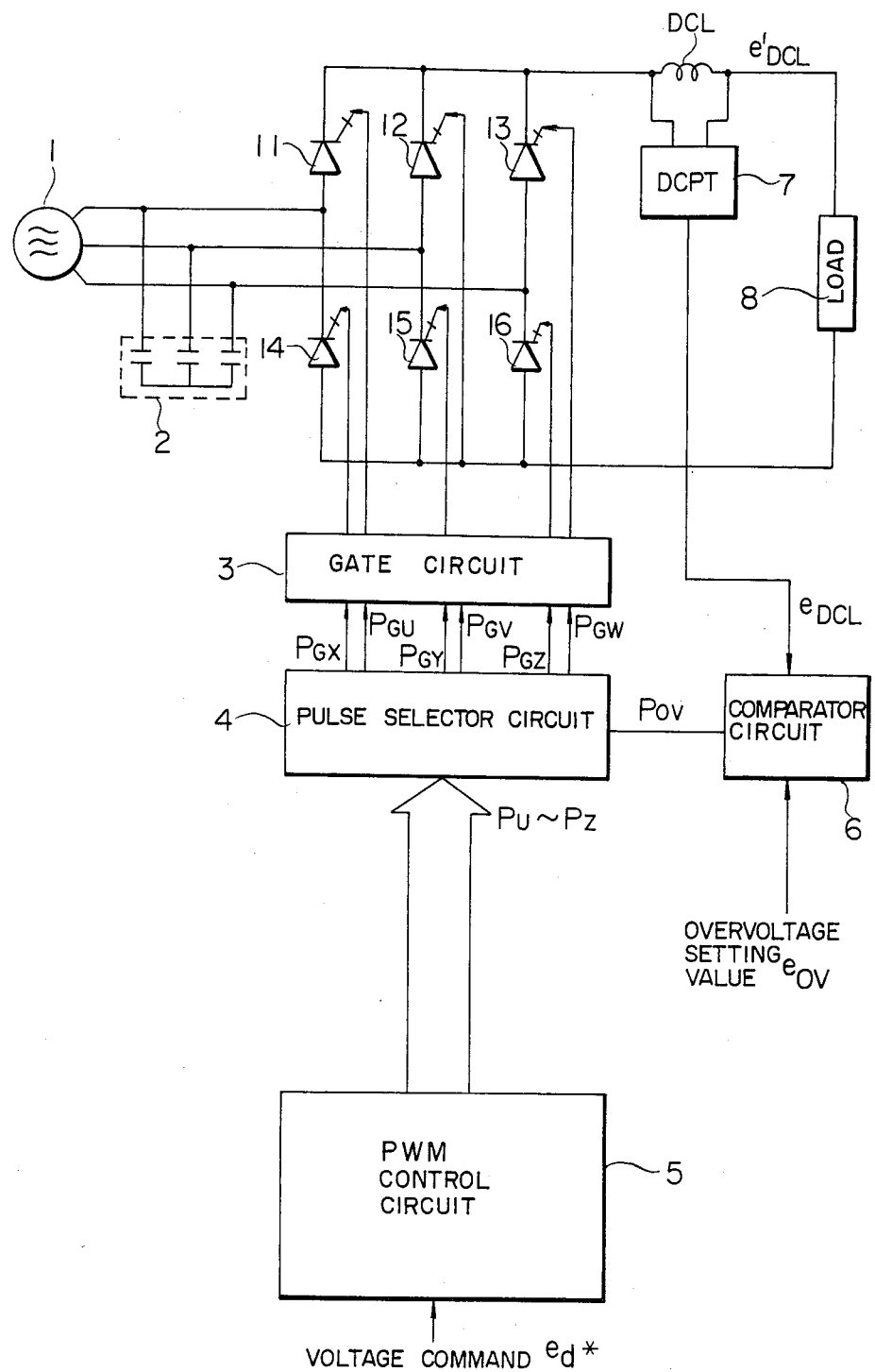
FIG. 1 is a circuit diagram showing a first embodiment of the current-type converter protecting apparatus according to the present invention.

Referring to the drawings, the invention will be described more in detail hereunder with respect to various embodiments thereof.

FIG. 1 is a circuit diagram showing a first embodiment of the present invention. In FIG. 1, the circuit arrangement includes an AC power source 1, input end capacitors 2, a gate circuit 3, a pulse selecting circuit 4, a pulse width modulation (hereinafter abbreviated to PWM) control circuit 5, a comparator circuit 6, a DC potential transformer (hereinafter abbreviated to DCPT) 7, a load 8, and gate turn-off silicon controlled rectifiers (hereinafter abbreviated to GTOs) 11–16 which are a kind of self-extinction elements. As shown in the drawing, the GTOs 11–16 constitute a converter unit in the form of a bridge circuit and the AC power source 1 is connected to the input side of the converter unit. The input end capacitors 2 are connected to the conductors between the AC power source 1 and the converter unit. The load 8 is connected to the output side of the converter unit through a DC reactor DCL. Under the condition, the DCPT 7 detects a voltage $e'_{DCL}$ across the DC reactor DCL to produce an output signal $e_{DCL}$. The comparator circuit 6 compares the output signal $e_{DCL}$ with a predetermined overvoltage setting value $e_{OV}$ so as to produce an output signal $P_{OV}$ only when the signal $e_{DCL}$ is larger than the overvoltage setting value $e_{OV}$, the signal $P_{OV}$ being applied to the pulse selecting circuit 4. The converter unit constituted by the bridge circuit of the GTOs 11–16 is controlled by the PWM control circuit 5, the pulse selecting circuit 4, and the gate circuit 3.

Figure 2:
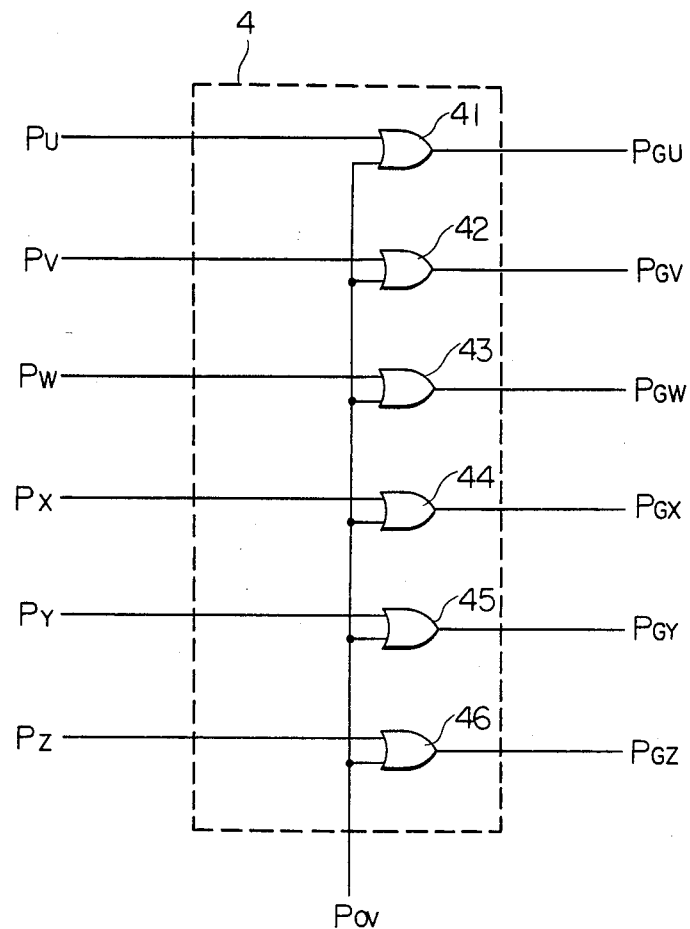
FIG. 2 is a circuit diagram showing the pulse selecting circuit in the first embodiment of FIG. 1.

FIG. 2 is a circuit diagram showing a specific arrangement of the pulse selecting circuit 4 shown in FIG. 1. As shown in the drawing, the pulse selecting circuit is constituted by six OR circuits 41–46. The output signal $P_{OV}$ is applied to one input of each of the OR circuits 41–46, and gate signal patterns $P_U$–$P_Z$ are applied from the PWM control circuit 5 to the respective other inputs of the OR circuits 41–46. The OR circuits 41-46 respectively produce output signals $P_{GU}$–$P_{GZ}$ which are applied to the gate circuit 3.

Figure 3:
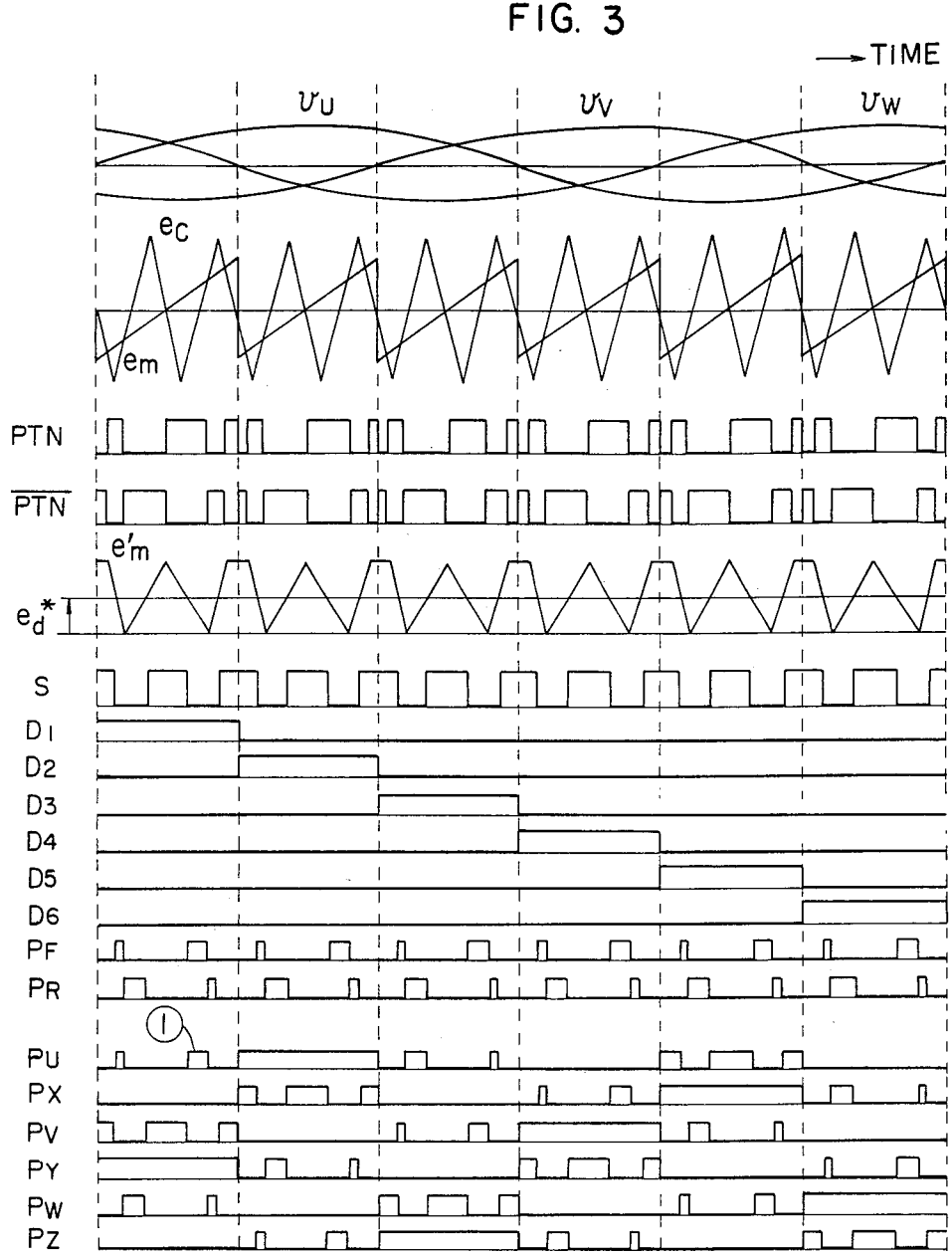
FIG. 3 is a time chart for explaining the operation of the first embodiment of FIG. 1.

FIG. 3 is a time chart for explaining the operation of the PWM control circuit 5 and the pulse selecting circuit 4 shown in FIG. 1. In FIG. 3, $V_U$, $V_V$, and $V_W$ represent respective phase voltages of the AC power source 1, and $e_c$ and $e_m$ represent respectively a carrier wave and a modulating wave for forming a PWM basic pattern PTN. $\overline{PTN}$ represents an inverted signal of the PWM basic pattern PTN. An unequal-period triangular wave $e'_m$ is synchronized with the rising and falling of the PWM basic pattern PTN and is compared, as shown in the drawing, with a DC voltage command value $e_d{}^*$ applied to the PWM control circuit 5, so as to obtain a shoot-through pulse S. $D_1$–$D_6$ represent distribution signals and $P_F$ and $P_R$ represent PWM patterns having a period of 60 degrees for actually forming gate signals. The PWM patterns $P_F$ and $P_R$ and the shoot-through pulse S are distributed to the respective phases in accordance with the distribution signals $D_1$–$D_6$ to thereby obtain the gate signal patterns $P_U$–$P_Z$ which are applied to the pulse selecting circuit 4 as shown in FIGS. 1 and 2. In the pulse selecting circuit 4 shown in FIG. 2, the gate signal patterns $P_U$–$P_Z$ are ORed with the output signal $P_{OV}$ of the comparator circuit 6 through the OR circuits 41–46 to thereby form the gate circuit input signals $P_{GU}$–$P_{GZ}$. Such a technique to form the gate signal patterns $P_U$–$P_Z$ as described above is well known conventionally.

Assume now that, for example, an erroneous turn-off pulse is mixed into the gate signal pattern $P_U$ to thereby turn the GTO 11 off at the point in time ① in FIG. 3. At the point in time ①, therefore, only the GTO 15 is in the on-state among all the GTOs constituting the converter unit. Accordingly, the circuit including the load 8 is opened and the voltage $e'_{DCL}$ as shown in the following equation is generated across the DC reactor DCL due to the energy which has been stored in the DC reactor DCL.

$$e'_{DCL} = LD \times \frac{di_D}{dt}$$

where LD represents the inductance of the DC reactor DCL and $i_D$ represents a DC current.

Generally, the inductance value of the DC reactor used in the current-type converter is large, for example, several tens mH, so that the voltage $e'_{DCL}$ generated across the DC reactor in accordance with the above equation is very large. The output signal $e_{DCL}$ of the DCPT 7 proportional to the DC reactor terminal voltage $e'_{DCL}$ is compared with the overvoltage setting value $e_{OV}$ in the comparator circuit 6, so that the output signal $P_{OV}$ of the comparator circuit 6 is made high ("H") when $e_{DCL} \geqq e_{OV}$ while made low ("L") when $e_{DCL} < e_{OV}$. When the output signal $P_{OV}$ is "H", all the respective outputs of the OR circuits 41–46, that is, all the gate circuit input signals $P_{GU}$–$P_{GZ}$ become "H". Accordingly, all the GTOs 11–16 are fed with on-gate signals so that the DC circuit becomes a shoot-through state to thereby suppress the overvoltage which has been so far generated across the DC reactor.

As described above, in the first embodiment illustrated in FIG. 1, the terminal voltage of the DC reactor DCL is detected by means of the DCPT 7 and compared with the overvoltage setting value in the comparator circuit 6 so as to make it possible to select pulses in the pulse selecting circuit 4, so that in case of occurrence of an overvoltage, the overvoltage can be suppressed by applying a turn-on signal to all the self-extinction elements GTOs 11–16 to thereby shoot-through the DC circuit. Accordingly, it is possible to protect the converter by means of a very simple arrangement and to carry out continuous operation of the converter.

Figure 4:
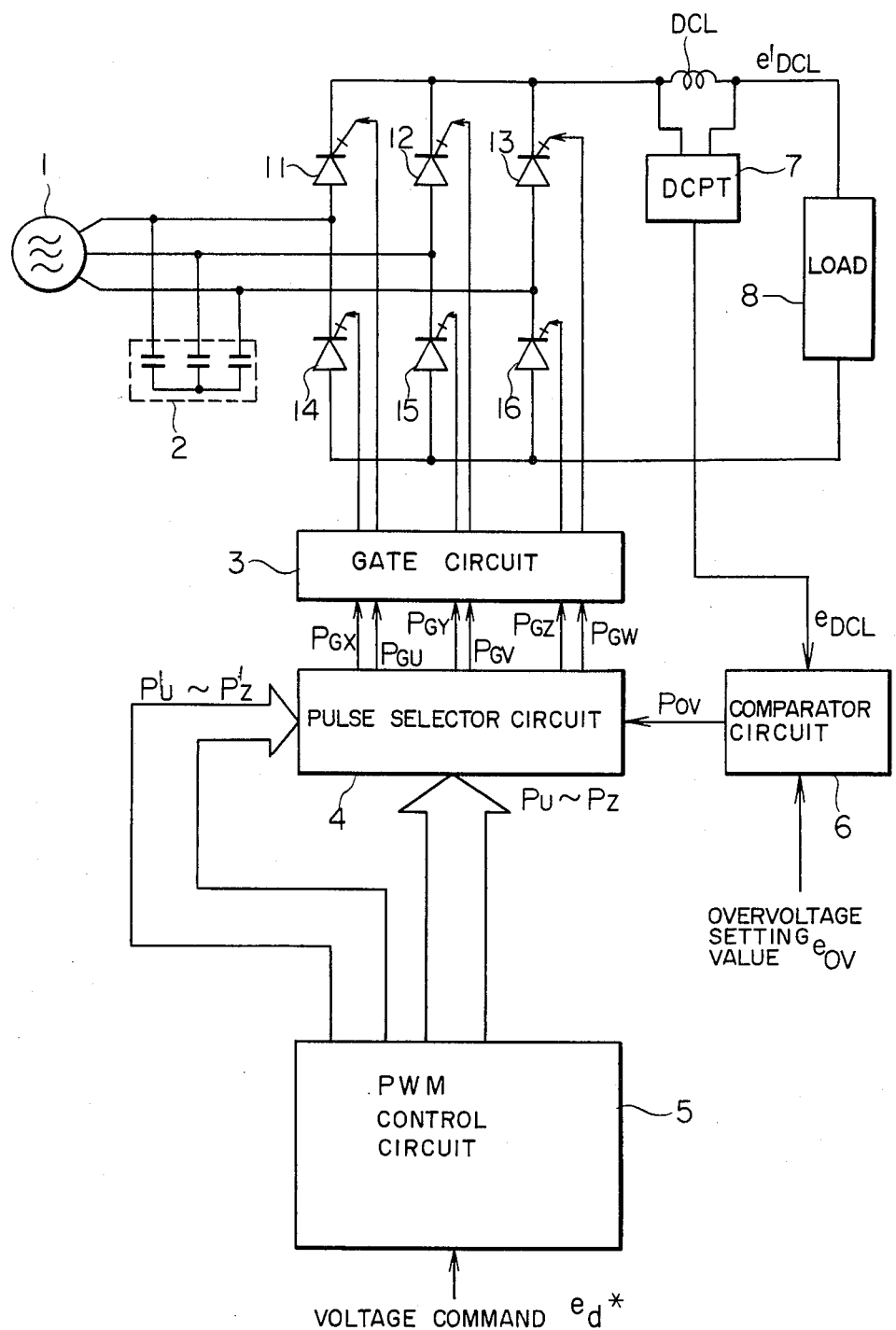
FIG. 4 is a circuit diagram showing a second embodiment of the current-type converter protecting apparatus according to the present invention.
Figure 5:
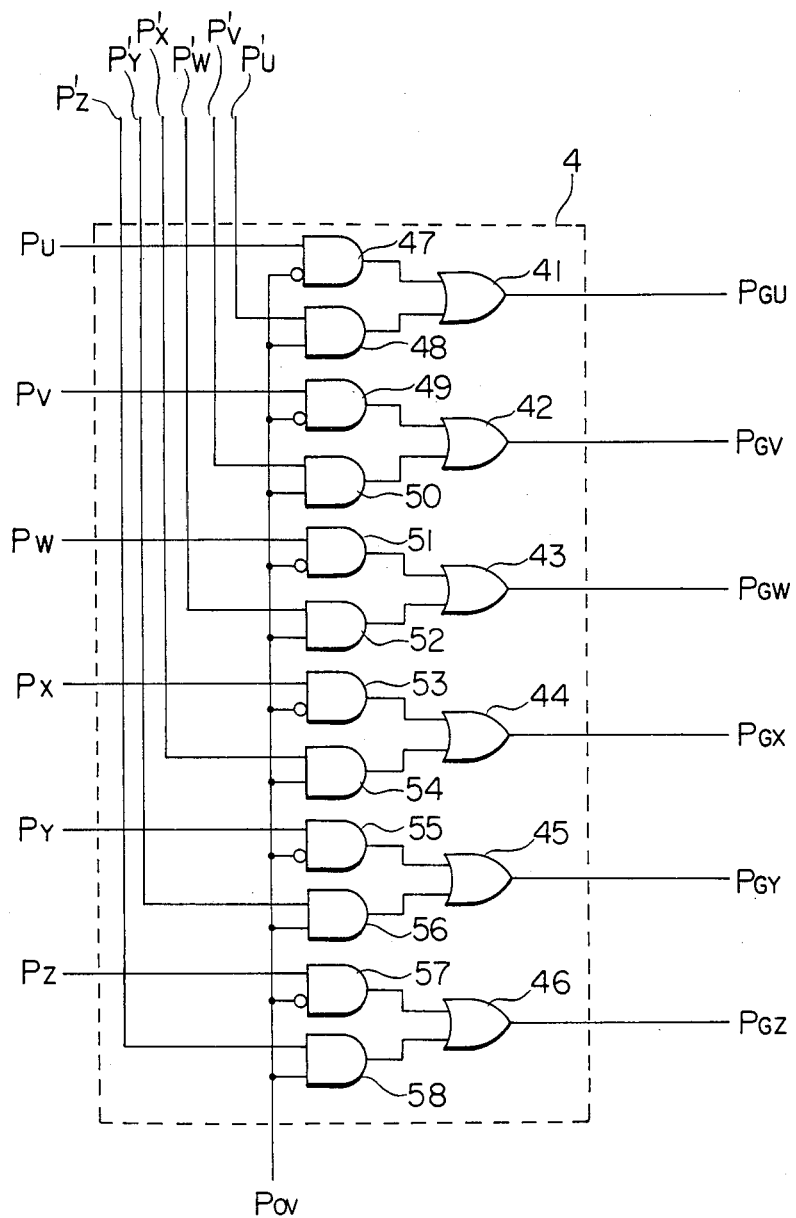
FIG. 5 is a circuit diagram showing the pulse selecting circuit in the second embodiment of FIG. 4.

FIG. 4 shows a second embodiment of the present invention and in FIG. 4 the same parts as those in FIG. 1 are correspondingly referenced. The second embodiment is characterized by the fact in that in addition to the gate signal patterns $P_U$–$P_Z$ from the PWM control circuit 5 and the output signal $P_{OV}$ from the comparator circuit 6, auxiliary signals $P'_U$–$P'_Z$ obtained from the PWM control circuit 5 are applied to the pulse selecting circuit 4. FIG. 5 shows a specific example of the pulse selecting circuit 4 shown in FIG. 4. In FIG. 5, the pulse selecting circuit 4 is constituted by OR circuits 41–46 and AND circuits 47–58. In the pulse selecting circuit 4 shown in FIG. 5, the gate signal patterns $P_U$–$P_Z$ are selected so as to be the input signals $P_{GU}$–$P_{GZ}$ to the gate circuit 3 when the output $P_{OV}$ of the comparator circuit 6 is "L", while the auxiliary signals $P'_U$–$P'_Z$ are selected so as to be the input signals $P_{GU}$–$P_{GZ}$ to the gate circuit 3 when the output $P_{OV}$ of the comparator circuit 6 is "H".

Figure 6:
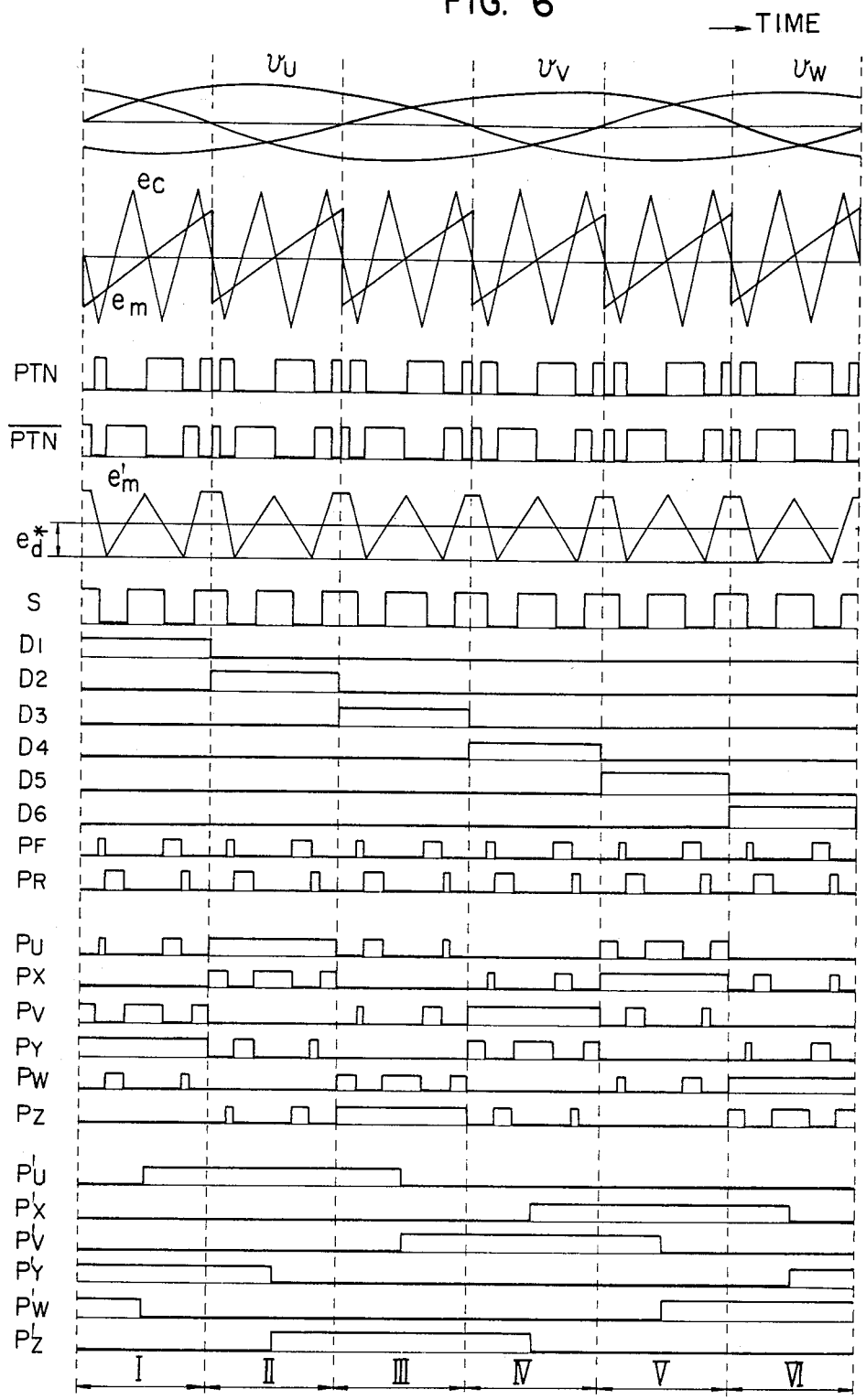
FIG. 6 is a time chart for explaining an example of the operation of the embodiment of FIG. 4.

FIG. 6 is a time chart for explaining an operation of the second embodiment of FIG. 4. In FIG. 6, the process of the production of the gate signal patterns $P_U$–$P_Z$ is the same as that in the foregoing first embodiment. The auxiliary signals $P'_U$–$P'_Z$ are produced in the following manner. For example, the auxiliary signal $P'_U$ is set to be a signal which is "H" in the period where the instantaneous voltage $v_U$ of the U phase of the AC power source is higher than the instantaneous voltages of any other phases, and similarly to this, the auxiliary signals $P'_V$ and $P'_W$ are set respectively corresponding to the instantaneous voltages $v_V$ and $v_W$. On the contrary, the auxiliary signal $P'_X$ is set to be a signal which is "H" in the period where the instantaneous voltage $v_U$ of the U phase of the AC power source is lower than the instantaneous voltages of any other phases, and similarly to this, the auxiliary signals $P'_Y$ and $P'_Z$ are set respectively corresponding to the instantaneous voltages $v_V$ and $v_W$. Those auxiliary signals $P'_U$–$P'_Z$ act to turn on the self-extinction element of the phase having the highest instantaneous source voltage among those self-extinction elements of the positive polarity arms of the bridge circuit of the converter unit, while acting to turn on the self-extinction element of the phase having the lowest instantaneous source voltage among those self-extinction elements of the negative polarity arms of the bridge circuit of the same converter unit. When an erroneous turn-off pulse is mixed into any one of the PWM patterns $P_U$–$P_Z$, the gate circuit input signals $P_{GU}$–$P_{GZ}$ are switched over to the auxiliary signals $P'_U$–$P'_Z$ by the pulse selecting circuit 4 so that the respective self-extinction elements of the phases having the highest and lowest instantaneous phase voltages are turned off at this point in time. Accordingly, a closed circuit from the AC power source 1 to the same through the self-extinction elements in the on-state, the DC reactor DCL, and the load 8 so as to increase the current flowing into the load 8 is formed so that an overvoltage generated at the DC reactor DCL can be suppressed. Specifically, the second embodiment is suitable to a converter employing self-extinction elements having a small withstand voltage in comparison with the current capacity thereof because the two self-extinction elements having the largest potential difference therebetween are turned on so that the overvoltage can be suppressed while the load current is increased.

As described above, according to the second embodiment of the present invention, the auxiliary pulse signals are selected by means of the pulse selecting circuit 4 so as to suppress an overvoltage at the DC reactor DCL so that it is possible to achieve proper protection of the converter in accordance with the instantaneous values of the source phase voltage and it is possible to carry out continuous operation of the converter.

Figure 7:
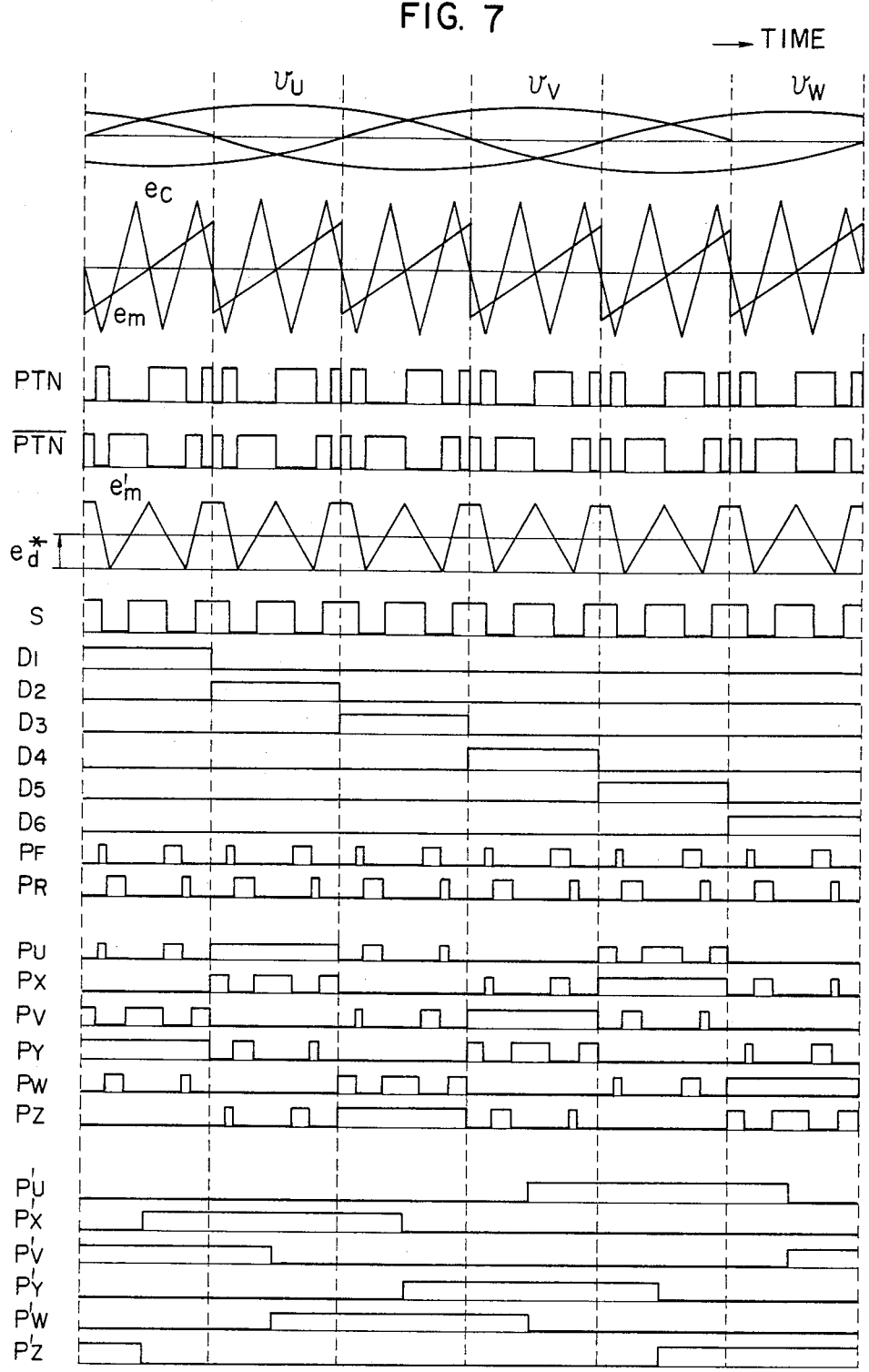
FIG. 7 is a time chart for explaining another example of the operation of the embodiment of FIG. 4.

Although the auxiliary signals $P'_U$–$P'_Z$ are arranged such that a turn-on signal is applied to the self-extinction element having the highest instantaneous source voltage among the self-extinction elements in the positive polarity arms of the converter unit and to the self-extinction element having the lowest instantaneous source voltage among the self-extinction elements in the negative polarity arms of the converter unit in the foregoing second embodiment, the auxiliary signals may be arranged such that a turn-on signal is applied to the self-extinction element having the lowest instantaneous source voltage among the self-extinction elements in the positive polarity arms and to the self-extinction element having the highest instantaneous source voltage among the self-extinction elements in the negative polarity arms. The operation in this modification is shown in the time chart of FIG. 7. In this modification, a closed circuit is formed such that a decreased load current flows from the AC power source through the turned-on self-extinction elements in the converter unit so that an overvoltage at the DC reactor DCL can be suppressed. Accordingly, on the contrary to the embodiment of FIG. 6, this modification is suitable to a current-type converter which employs self-extinction elements having a small current capacity in comparison with the withstand voltage thereof.

Figure 8:
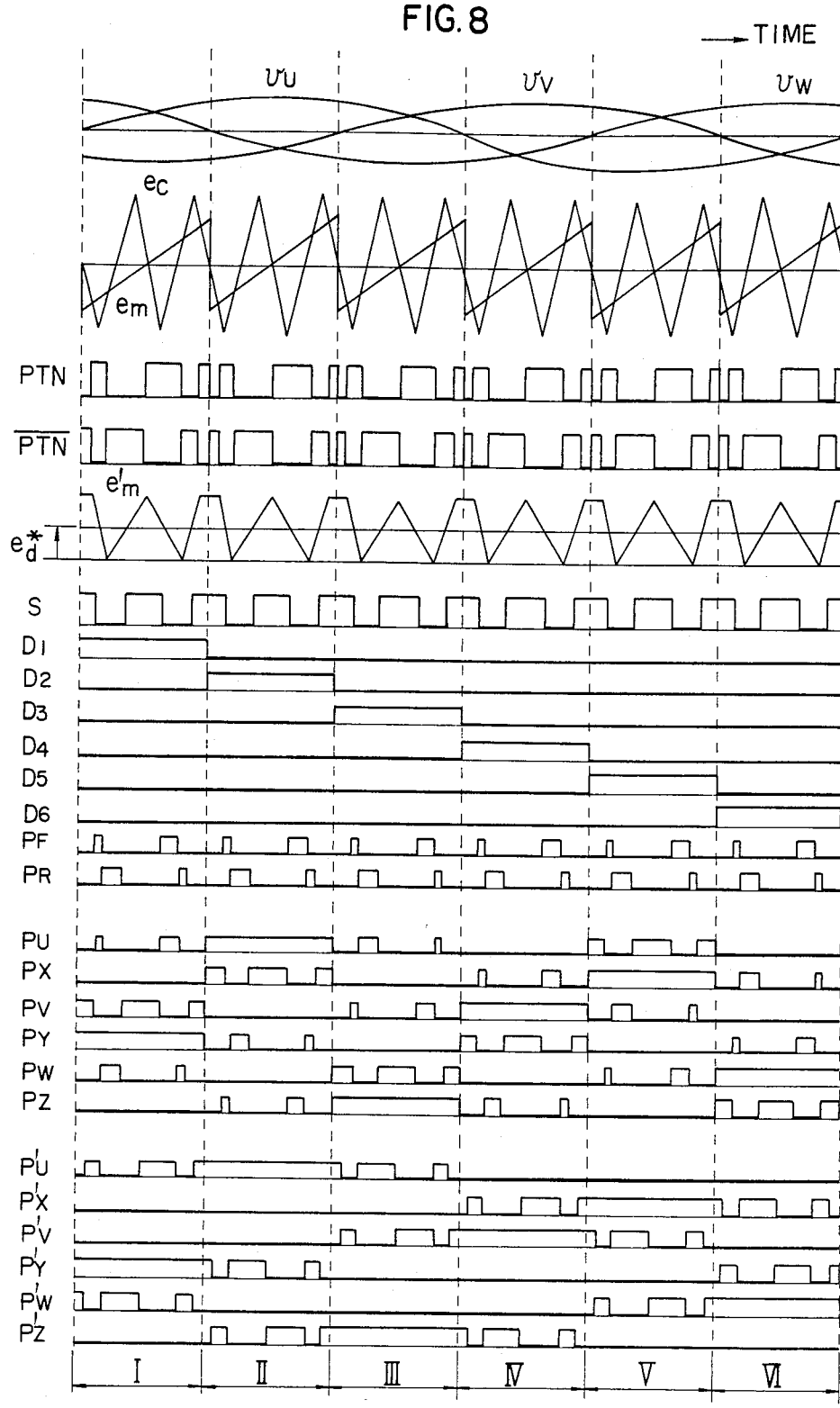
FIG. 8 is a time chart for explaining a further example of the operation of the embodiment of FIG. 4.

FIG. 8 is a time chart showing the operation of another modification of the second embodiment illustrated in FIGS. 4 and 5, in which auxiliary signals $P'_U$–$P'_Z$ different in form from those used in the second embodiment are employed. In FIG. 8, the auxiliary signals $P'_U$–$P'_Z$ can be formed in the following manner. That is, the PWM basic pattern PTN is distributed in accordance with the distribution signals $D_1$–$D_8$ to thereby obtain the auxiliary signals $P'_U$–$P'_Z$. In this case, the shoot-through pulse is not distributed. In the period I, for example, the signals $P'_U$ and $P'_W$ have respective patterns logically inverted from each other. In case where an erroneous turn-off signal is mixed into any one of the gate signal patterns $P_U$–$P_Z$, the gate circuit input signals $P_{GU}$–$P_{GZ}$ are switched over to the auxiliary signals $P'_U$–$P'_Z$ by the pulse selecting circuit 4 so that the converter is operated with the patterns $P'_U$–$P'_Z$ in the state where the width of the shoot-through pulse is zero. Accordingly, a current flows from the AC power source 1 into the load 8 through the turned-on self-extinction elements in the two arms so that an overvoltage at the DC reactor can be suppressed.

As described above according to the modification of FIG. 8, the auxiliary signals $P'_U$–$P'_Z$ are selected by the pulse selecting circuit 4 so that an overvoltage at the DC reactor can be suppressed. At this time the PWM control is also carried out so that the protection and continuous operation of the converter can be carried out without disturbing the power source current waveform.

Figure 9:
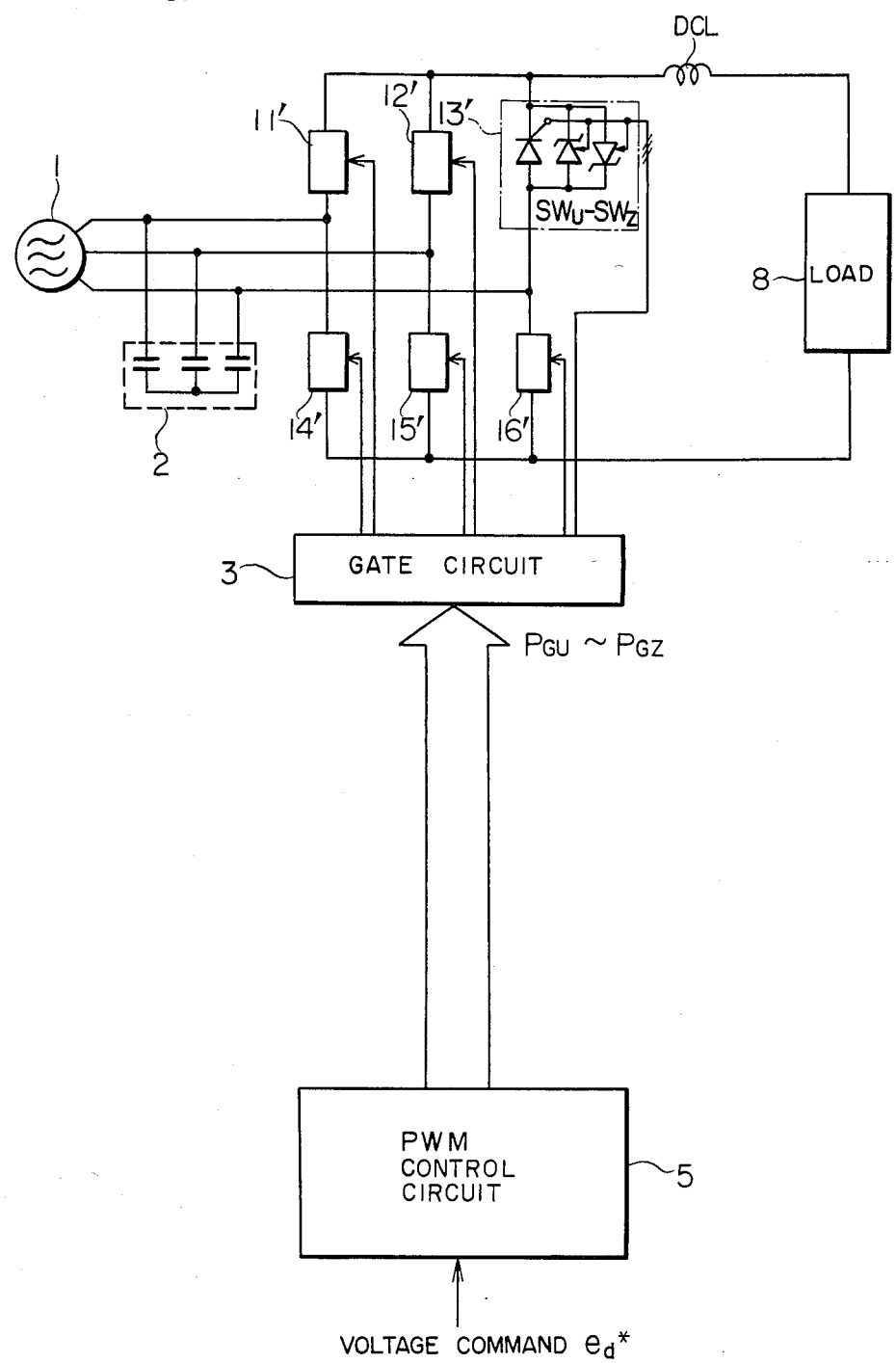
FIG. 9 is a circuit diagram showing a third embodiment of the current-type converter protecting apparatus according to the present invention.

FIG. 9 shows a circuit arrangement of a third embodiment of the present invention. Although the self-extinction elements GTOs 11–16 are employed as elements constituting the main circuit of the converter in the first and second embodiments, switching elements $SW_U$–$SW_Z$ having the following characteristics are employed as the constituent elements $11'$–$16'$ of the main circuit in this third embodiment.

(1) The on/off state of each of the switching elements can be controlled by a gate signal; and (2) Each of the switching elements has a Zener breakdown property, the Zener voltage being changeable.

In the case where the DC circuit of the converter is opened by an erroneous turn-off pulse to generate an overvoltage at the DC reactor so that the overvoltage is applied to the main circuit constituent elements, Zener breakdown is caused in the elements owing to the foregoing characteristic (2) so as to make the elements conductive to form a closed current circuit including the DC reactor so that the overvoltage generated at the DC reactor can be suppressed.

Such a switching element having the foregoing characteristics (1) and (2) may be constituted by a GTO and varisters or Zener diodes connected to the GTO in parallel thereto in the forward and backward directions as shown by a reference numeral $13'$ representatively.

Thus, the elements can be protected without providing any protecting device for the suppression of an overvoltage, so that the main circuit and the control circuit can be made extremely simple in arrangement. Further, an overvoltage has been suppressed, the elements return to their normal operating state from Zener breakdown so that the converter can be continuously operated.

Thus, according to the present invention, in case of generation of an overvoltage at the DCL, the overvoltage is detected by means of the DCPT and the gate signals are controlled by the pulse selecting circuit, so that the converter can be protected from the overvoltage and the operation of the converter can be continuously carried out when the overvoltage has been suppressed.

We claim:

1. In a current-type converter system having a current-type converter constituted by self-extinction elements and a DC reactor connected to an output side of said converter for suppressing pulsation in an output DC current of said converter, an apparatus for protecting said converter comprising:

detector means for detecting a terminal voltage of said DC reactor;

comparator means for comparing an output value of said detector means with an overvoltage setting value with respect to said voltage due to said DC reactor; and control means for controlling a gate signal for said self-extinction elements so that a closed circuit including said DC reactor is formed in response to an output signal from said comparator means indicating that said voltage due to said DC reactor exceeds said overvoltage due to said DC reactor exceeds said overvoltage setting value.

2. The converter protecting apparatus according to claim 1, in which said detector means is arranged so as to detect a terminal voltage of said DC reactor.

3. The converter protecting apparatus according to claim 1, in which said control means produces a gate signal for turning on all the self-extinction elements constituting said converter when said comparator means produces a signal indicating that said voltage due to said DC reactor exceeds said overvoltage setting value.

4. The converter protecting apparatus according to claim 1, in which said control means produces a gate signal for turning on all the self-extinction elements of an arm of said converter having highest instantaneous phase voltage when said comparator means produces a signal indicating that said voltage due to said DC reactor exceeds said overvoltage setting value.

5. The converter protecting apparatus according to claim 1, in which said control means produces a gate signal for turning on one of said self-extinction elements of an arm of said converter having the lowest instantaneous phase voltage when said comparator means produces a signal indicating that said voltage due to said DC reactor exceeds said overvoltage setting value.

6. The converter protecting apparatus according to claim 1, in which said control means produces a gate signal for turning on one of said self-extinction elements in accordance with a PWM basic pattern when said comparator means produces a signal indicating that said voltage due to said DC reactor exceeds said overvoltage setting value.

7. The converter protecting apparatus according to claim 1, in which said self-extinction elements are arranged so that their on/off states are controlled by said gate signals, each of said self-extinction elements having Zener breakdown property with a changeable zener voltage in a forward direction as well as a backward direction.

8. In a current-type converter system including a current-type converter composed of self-extinction elements, PWM control means for PWM-controlling said converter in accordance with a PWM basic pattern, and a DC reactor connected to a DC output side of said converter, an apparatus for protecting said converter comprising:
  said PWM control means constituted by means for generating normal PWM pulses in accordance with said PWM basic pattern and means for generating auxiliary PWM pulses in accordance with said PWM basic pattern;
  overvoltage detection means for detecting a fact that a terminal voltage of said DC reactor becomes an overvoltage; and
  means for switching said normal PWM pulses into said auxiliary PWM pulses in response to an output of said overvoltage detection means to thereby control said self-extinction elements.

9. The converter protecting apparatus according to claim 8, in which said normal PWM pulses include a shoot through pulse for turning all of said self-extinction elements on at the same time, while said auxiliary PWM pulses do not have a shoot through pulse.

10. In a current-type converter system including a current-type converter composed of self-extinction elements, a DC load, and a DC reactor connected between said converter and said load for suppressing current pulsations, an apparatus for protecting said converter comprising:
  overvoltage detection means for detecting a fact that a terminal voltage of said DC reactor exceeds a predetermined value; and
  control means responsive to said overvoltage detection means for controlling gate signals for said self-extinction elements so as to form a closed circuit through said DC reactor, said load, and said converter.

* * * * *